United States Patent [19]

Evans et al.

[11] 4,155,521
[45] May 22, 1979

[54] CANNON LAUNCHED PLATFORM

[75] Inventors: John L. Evans, Oakland; Walter J. Krupick, Succasana; Jay Hoffman, Livingston, all of N.J.

[73] Assignee: The Singer Company, Littls Falls, N.J.

[21] Appl. No.: 638,465

[22] Filed: Dec. 8, 1975

[51] Int. Cl.$^2$ ............... F41G 7/00; G01C 19/28; G01C 19/12; G01C 19/24
[52] U.S. Cl. .................... 244/3.16; 74/5.1; 74/5.4; 74/5.6 A; 75/5.7
[58] Field of Search ............. 244/3.16, 3.17; 74/5.6, 74/5.1, 5.7, 5.12

[56] References Cited

U.S. PATENT DOCUMENTS

| | | | |
|---|---|---|---|
| 3,187,588 | 6/1965 | Parker | 74/5.7 |
| 3,446,082 | 5/1969 | Speen et al. | 74/5.7 |
| 3,756,538 | 9/1973 | McLean | 244/3.16 |
| 3,824,865 | 7/1974 | Evans et al. | 74/5.7 |
| 3,920,200 | 11/1975 | Evans et al. | 244/3.16 |

Primary Examiner—Samuel W. Engle
Assistant Examiner—Thomas H. Webb
Attorney, Agent, or Firm—L. A. Wright; T. W. Kennedy

[57] ABSTRACT

A gyro seeker which is capable of use in a cannon launched missile. The gyro seeker is enclosed in a housing mounted in the nose section of the missile. The platform of the gyro seeker supports an optical assembly, a detector, a gyro assembly, and a cryostat for cooling the detector. Means are provided on the outer gimbal of the platform for withstanding the extreme acceleration induced by cannon launching. The platform is torqueable along two axes by a plurality of pole pieces located around its base. A platform caging device is provided to cage the platform during transport and serves a dual function as a means to furnish spin-up gas to the gyro element and cooling gas to the cryostat.

13 Claims, 5 Drawing Figures

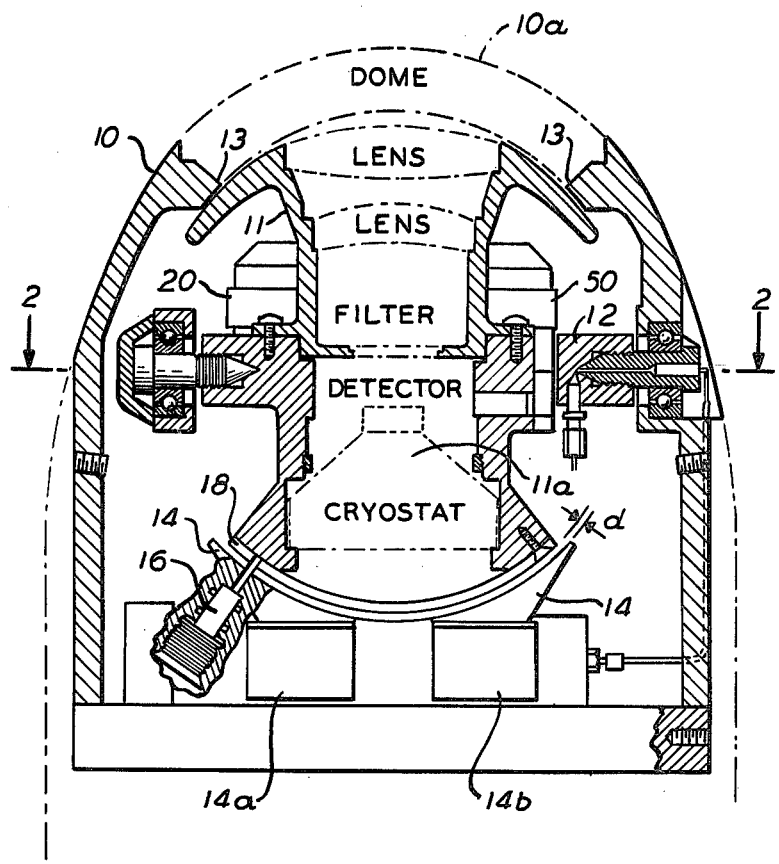
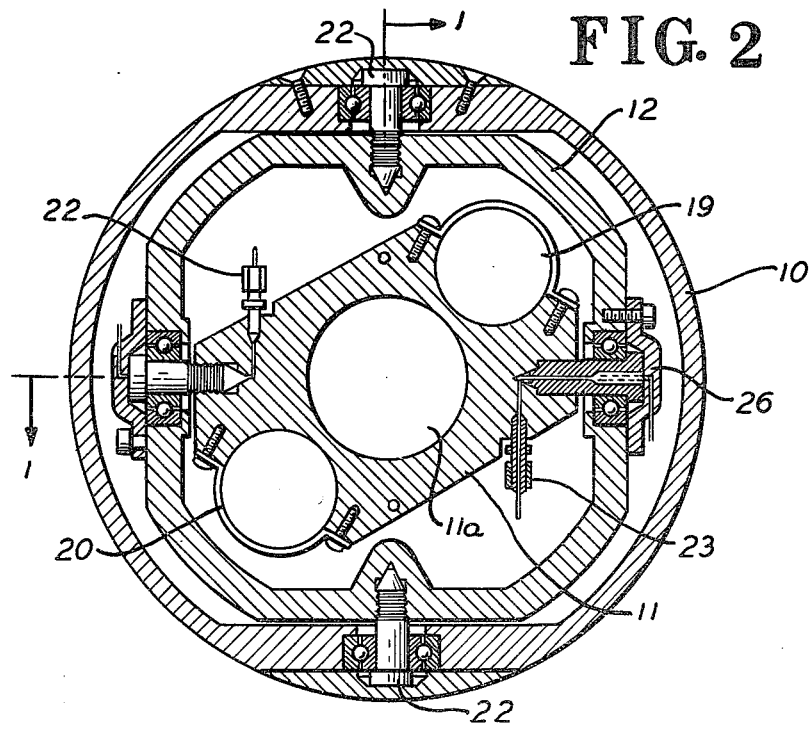

CANNON LAUNCHED PLATFORM

This invention is related to a gyro seeker which may be employed in a guided projectile. More particularly, this invention relates to a platform having means to withstand launching from a cannon.

BACKGROUND OF THE INVENTION

The general purpose of a gyro stabilized seeker is to provide a signal proportional to the rate of change of the line of sight angle between a target and an intercepting vehicle. When this information is properly mechanized in the control system of the interceptor, an optimum interception course is flown and a high probability of collision with the target is achieved.

The employment of a gyro optical system in directing a projectile to a target is known to those skilled in the art. In such a system, the guidance system tracks a source of radiation which may be visible light or infrared rays and homes in on the target. Where gyro optical systems of the type describe are to be employed in cannon launched missile systems, problems arise in devising gyroscopic elements that are capable of withstanding the extreme acceleration and deceleration loads inherent in cannon launching. Failure to build in means to withstand high induced acceleration forces may result in total failure of the gyro device.

The present invention provides unique platform deloading means whereby the gyro seeker is capable of functioning after being launched from a cannon. This requirement of withstanding cannon launching determines the general exterior shapes of the parts and necessitates deloading or protection of the devices on the gimbal bearings. It also dictates the general configuration and type of gimbal torquer which has the function of a stop as well as that of a torquer. Another important determinant of the general configuration of the device is the telescope and detector size. Finally, another constraint is imposed on the gyro design by the special needs of the detector assembly. The detector requires cooling fluid to function properly. Immediately after launch a very high pressure flow is needed to cool the detector rapidly from ambient to a low value. Then a sustaining flow of fluid at a lower pressure is required to maintain the temperature at that value. The present invention comprises a gyro having a two axis platform. The concept of gimballing a control structure is not new. However, the means by which the launch shock is sustained and the bearings protected and other design features are new.

BRIEF DESCRIPTION OF THE INVENTION

The gyro seeker of the present invention is intended to be enclosed within a housing on the nose section of a projectile or missile. The housing has a transparent dome shaped window at its forward section whereby radiation may enter the device. Within the housing are situated the optical assembly, the gyro assembly, the cyrostat/detector assembly, and the platform of the gyro seeker. The platform supports all of the above assemblies in a unique manner such that the device is capable of withstanding the extreme acceleration induced by cannon launching. This is accomplished by forward and rear stops adjacent to the platform and by gimbal structures which distribute acceleration loads onto the platform wall and away from the gimbal bearings. The platform inner gimbal is supported by an outer gimbal ring which in turn is supported on bearings in the housing. The platform is torqueable along two axes by a plurality of pole pieces located around its base. A platform caging device is provided to cage the platform during transport and to furnish gas for both spin-up of the gyro element and for cooling the detector.

Accordingly, it is an object of this invention to provide a stabilized gyro seeker which is capable of operation following cannon launching.

It is another object of this invention to provide a stabilized gyro seeker which can accomodate a large telescope diameter.

It is a further object of this invention to provide a stabilized gyro seeker that supplies a fluid continuously to a cryostat on the inner gimbal.

It is yet a further object of this invention to provide a stabilized gyro seeker that supplies gas through its caging mechanism for rapid initial cooling of the detector.

It is still a further object of this invention to provide a stabilized gyro seeker having deloading means in order to withstand cannon launching.

These and other objects and advantages of the invention will be more readily understood by those skilled in the art after a detailed consideration of the following specification taken in conjunction with the accompanying drawings wherein:

FIG. 1 is a cross sectional elevational view of the gyro seeker taken along the line 1—1 of FIG. 2;

FIG. 2 is a cross sectional view of the gyro seeker taken along the line 2—2 of FIG. 1;

Figure 3:
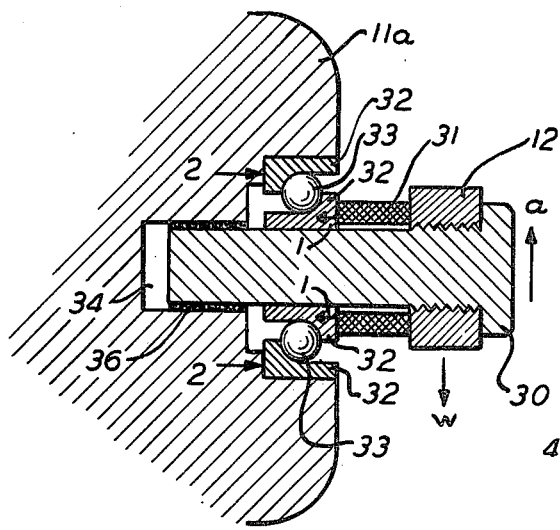
FIG. 3 is a cross sectional view of the bearing deloading mechanism of the gyro seeker.

Referring to FIGS. 1 and 2, numeral 10 designates the housing having dome shaped window (shown in phantom outline) of the gyro seeker which is positioned over the nose section of a cannon launched missile. Mounted within the housing is a barrel assembly or inner platform gimbal 11. An outer gimbal ring 12 supports platform 11 for movement along two axes in the housing. Projections 13 formed inwardly of the forward section of housing 10 serve as forward stops for platform 11 and pole pieces 14 serve as rearward stops for the platform. A platform caging mechanism 16 located adjacent the base of the platform serves to cage the platform during transport. There are four pole pieces 14 positioned 90° from each other around the base of platform 11. A spherically shaped magnetically permeable layer 18 is formed on the base of platform 11 and serves in conjunction with pole pieces 14 as the means for torquing the platform.

It is seen from FIGS. 1 and 2 that platform 11 has a cylindrical configuration having a generally flat rectangular (in cross section) platform housing intermediate its length which supports a miniature two-axis gas bearing gyro 50 and gyro counterbalance 20. The purpose of counterbalance 20 is to balance the weight of gyro 50 on the platform. The use of the platform assembly as the inner gimbal reduces the suspended weight to a minimum and thus gains an advantage in gunshot hardness and cost. The central core 11a of the platform is designed to contain the optics, detector, and cryostat assembly (shown in phantom outline) for the gyro seeker which can be manufactured and tested as a complete sub-assembly. A suitable optical, detector and cryostat assembly useable with this invention is described in copending application, U.S. Patent Application Ser. No. 622,561 filed Oct. 15, 1975, and issued as U.S. Pat. No. 4,047,481 on Sept. 13, 1977. The platform is caged against setback and rebound forces by spherically contoured forward stops 13 and rearward stops 14. The caging forces generated in these stops act generally in compression along the platform column rather than in a bending mode to minimize distortion and thus preserves alignment in the optics. The rearward stops serve a multiple function in that they are the stators of the platform torquers and pickoffs.

The platform torquer assembly consists of four columns or magnetic poles 14 projecting axially towards the base of the platform. Each pole face is spherically contoured from the gimbal pivot center and subtends an arc of approximately 40 degrees. The magnetically permeable spherically shaped layer 18 at the bottom of platform 11 is preferably made of steel and acts as a magnetic return path for the poles 14. The gap, d, separating the two is 0.020 inch.

The torquers operate in the following manner. Two coils, (not shown) one bias and one control are wound around each column surface. For each opposed pair of poles, the bias coils are connected with the same polarity while the control coils oppose one another. A control current augments the flux in the gap due to bias current above one pole face while reducing it in the other gap. As a result, a torque is generated in a direction so as to increase the overlap between the stator and return path. This torque is linear with control current within 5% over the entire angular freedom of 20° on both axes. Cross coupling between torquers is negligible. A maximum torquer output of 2 ounch-inches has been designed for this application at a power of 9 watts. To achieve the pickoff function, the poles 14 are partially slotted in the axial direction so that they present two faces to the return path. Small coils are wound around each of the two poles thus produced and are driven by an a-c signal. Their inductance is directly proportional to overlap of the torquer return path and stator pole face. The two coils connected in series as a unit from each stator on a given axis are inserted as arms in an inductance bridge. A difference voltage is generated that is linearlly proportional to the differential inductance and thus the differential overlap of the return path or the gimbal angle. A pickoff scale factor of 10 millivolts/degree has been designed for this application. Total power consumed is less than 0.2 watts.

Outer gimbal 12 is the path through which all electrical signals, power and sustaining gas is delivered to the telescope and gyro assembly. The electrical leads (not shown) are bonded to the gimbal, mechanically restrained where appropirate, and they bridge gimbal bearings with loops. One gas lead 23 is brought in through rotating joints in the gimbal trunnions 26. These joints are simply a quill running through a compressed graphite sleeve retained by a cap. They have proven to perform at pressures of 2000 lb/in² without significant leakage or torquers inconsistent with gimbal torquers. The sustaining gas for the platform, gyro bearing, and cryostat can be operated from the prime gas supply. The gyro requirements are met by 60 lb/in² picked off through an orifice.

As best seen in FIG. 2, outer gimbal 12 is a flattened circular ring. This shape provides minimum mass for clearance requirements and also lends itself to a design such that its spring rate is controlled. This is an important consideration in that it is necessary that deflections resulting from setbacks and rebound do not produce forces high enough to damage the gimbal bearings 22. The gimbal bearings are standard angular contact bearings. Their radial load capacity is 400 pounds maximum with slight brinelling. The gimbal ring has a mass of 0.27 pound. Therefore, for example upon setback of 12,000 g each bearing on average will support 850 pounds radially. At twice the maximum radial value for the bearing it is likely that unacceptable damage will occur. Therefore, a bearing deload mechanism is required.

Referring to FIG. 3, the deloading system of the present invention is shown. Outer gimbal ring 12 acts as a spring and has a mass (m). When experiencing an acceleration a it has weight $W=ma$, that must be supported. When a is small the bearings provide the supporting force $-W$. However, the bearings 32 are compliant. They can deflect in the neighborhood of 0.0007 inches before damage occurs. As the load W increases they deflect. As the bearing deflects the 0.0005 inch gap 36 closes on the side opposite to which a is pointing when the load W reaches the value $K_x$ 0.0005 inches. Where K is the bearing spring rate in lb/inch the gap is completely closed. Thereafter, no matter how much larger W becomes the increased deflection of the bearing is very slight compared to 0.0005 inches. Virtually all additional force is provided by the line to line contact at the point where 0.0005 inch gap disappeared.

Earlier it was mentioned that gimbal 12 was a continuous ring that acted as a spring as well as having mass. The spring property is used to preload the bearing. The preload is accomplished by applying force to the bearing races 32 in opposite directions (indicated by arrows 1 and 2). This force determines the bearing function and compliance. Its magnitude is adjusted by altering the length of the pre-load shim 31. The gap between the shim and bolt 30 is not significant. It can be seen that the bolt is not fastened to inner gimbal 11 in any way. It is restrained in the direction perpendicular to a by being screwed into outer gimbal 12. An alternate is to screw it into the pre-load shim. It is also possible to reverse the entire procedure by mounting the bearing in gimbal 12. However, this ususally results in additional mass in the gimbal 12 and thus is not desireable.

Figure 4:
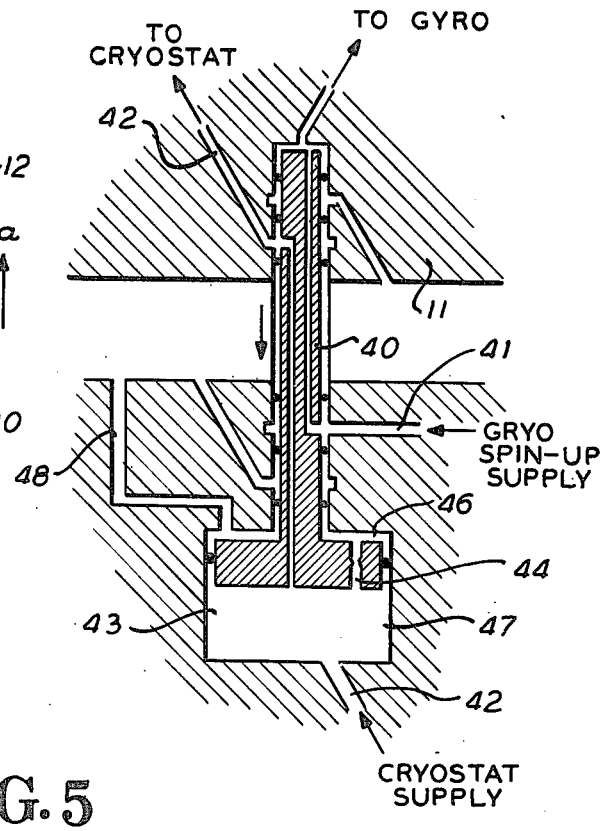
FIG. 4 is a cross sectional view of the transport caging and gas supply mechanism of the gyro seeker.

Turning to FIG. 4, gyro spin up and the rapid cool down gas for the cryostat enters the platform through a withdrawable quill 40. This quill also provides transportation caging of the gimbals. It is automatically withdrawn from platform 11 after the three-second cool down cycle is complete and the 6000 lb/in² cryostat gas is exhausted. It can be reinserted remotely by nulling the platform pickoffs and applying a pulse of available air to the base of the caging quill. It must be remembered that this caging device is not meant to protect the platform during the 12,000 g shock. That function is assumed by the large caging surfaces previously discussed and its operation is discussed in the following paragraphs.

In the caged position, two gas lines 41 and 42 in the quill connect lines in the gimbal leading to the gyro spin up and cryostat respectively to their supplies in the vehicle. Upon actuation, 6000 lb/in² gas enters the chamber 43 beneath quill 40 and the gyro spin-up supply is also initiated. Some of the 6000 lb/in² gas leaks through the controlled orifice 44 raising the pressure in the chamber above the quill base. The charging time constant of this orifice volume is somewhat longer than the discharge time of the 6000 lb/in² supply. As the 6000 lb/in² supply blows down, a point is reached when the pressure in the upper volume 46 exceeds that in the lower volume 47. The quill is then urged downward, uncaging platform gimbal 11. Recaging is accomplished by aligning the gimbals and applying available compressed gas to the 6000 lb/in² line. A vent 48 in the upper volume is provided to insure proper recaging. The gyro spin-up supply is designed to be exhausted in 1/6 the time required to exhaust the cryostat supply.

Figure 5:
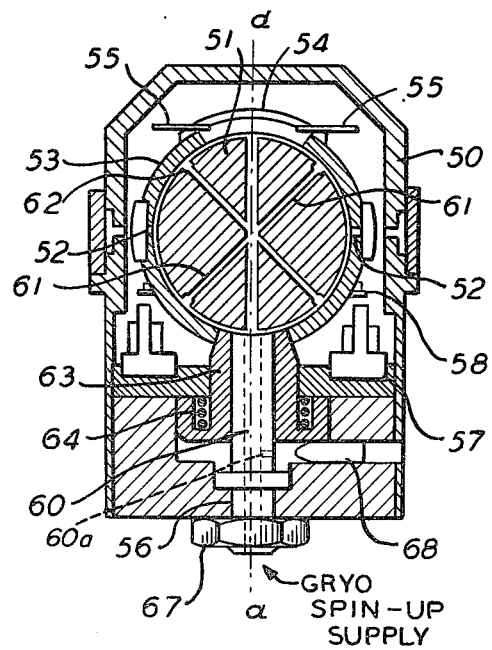
FIG. 5 is a cross sectional elevational view of the gyro assembly.

Referring to FIG. 5, it is seen that the gyro 50 is a spherical gas-bearing type. The stator 51 is a ⅝ inch diameter ball mounted on pedestal 56 in which two orifice planes 52 are located. The rotor 53 is a spherical shell 1/16 inch thick. The upper opening on the rotor is sealed with a cap 54. Two sustainer tubes 55 radiate from this cap. Gas at 9 lb/in² is emitted tangentially from these tubes thereby sustaining rotation of the rotor. This serves as a simple motor and provides scale-factor stability adequate for line-of-sight rate measurements over the temperature range. Pedestal 56 which is bolted to the gyro housing by a nut 67 contains a passage 60 for the admission of the gyro spin-up gas supply to rotor 53. A caging piston 63 is normally held up against rotor 53 by caging pin 68 thereby preventing movement of rotor 53. At spin-up of the rotor gas entering passage 60 passes through a port 60a and forces caging pin 68 to the right, spring 64 which was under compression expands forcing piston 63 downward thereby uncaging the rotor.

The gyro pickoff and torquer assembly 57 is of proven design. Four columns in the shape of tuning forks are mounted beneath a rim 58 of magnetic steel on the rotor. This acts as a return path for flux emanating from the four torquers. Four coils (not shown) are wound on each column; two around the base of tuning fork act as control and bias coils of the torquers. Flux produced by these coils in opposing columns produces a linear differential attraction on the return path proportional to the control current. This is a measure of the LOS rate.

One coil is wound on each of the tuning forks. These coils are connected in series with both sets of coils on an axis serving as arms of a reluctance bridge. The inductance of each pair is inversely proportional to the angular displacement of the return path and thus the rotor vis-avis the ends of the forks. A voltage linearly proportional to the displacement is the bridge output.

The film cast gas bearing gyroscope is uniquely qualified for this type of "g" loading by virtue of design and selected materials. In conventional gyroscopes metal to metal bearing contact at high "g" loading leads to brinelling and bearing damage at the point of load application. No bearings with metal to metal contact are used in the film cast gyroscope. In this invention, the rotor is lined with a resilient thin film of resin of 0.010 inch thickness. The film for the rotor is cast in a precision mold to form a bearing surface. The bearing stator is made of metal so that deformation upon "g" loading takes place entirely in the resilient cast film. Since the bearing gap is very small ($5 \times 10^4$ inch), a large contact area is formed when the unsupported rotor contacts the stator thus leading to very low film stresses with no residual deformation in the rotor or ball.

Assuming that an electro/optical detector and telescope are installed, the invention operates in the following way. As a target visible to the detector appears that is not aligned on the boresight of the detector, an output error signal is generated. This signal is amplified and applied to platform torquer 14 causing the platform to slew and attempt to null the detector. As a result of this platform motion, gyro 50 is driven off null. Its pickoff signals are amplified and used to excite the gyro torquers 57 and 58 in an attempt to null itself. This current is directly proportional to the time rate of change of the line of sight to the target and is the information required to fly an optimum intercept course.

The prime advantages of this invention are in its suitability to the cannon launch environment. No platform of this nature has been build in the past. This is achieved through its very distinctive bearing load relief mechanism which is notably simple and yet very effective. Another advantage, is that the telescope diameter which can be accomodated by the device is relatively large. A third advantage of the device is that it can supply gas continuously to a cooler on the gimbal. A fourth advantage is that it also can provide an additional pulse of gas through its caging mechanism for rapid initial cooling.

From the foregoing a gyro seeker having means to withstand cannon launching has been described. While a particular embodiment of the invention has been shown and described, modifications may be made, and it is intended in the following claims to cover the embodiments which fall within the true spirit and scope of the invention.

What is claimed is:

1. A gyro platform capable of use in a cannon launched missile comprising:
    a housing having a dome-shaped transparent window for admitting radiation to an optical and a detector assembly mountable within said housing;
    an outer gimbal ring supported in said housing on rotatable means;
    a platform rotatably supported by said outer gimbal said platform comprising an inner gimbal and having means to support the optical and detector assemblies;
    a gyro element on said platform for providing signals proportional to line of sight rate, and
    means on said outer gimbal rotatable means for deloading said gyro platform from the high acceleration forces of cannon launching.

2. The apparatus of claim 1 comprising:
    means in said outer gimbal ring for transmitting spin-up gas to said gyro through said platform.

3. The apparatus of claim 2 comprising:
    a counterbalance on said platform positioned to balance the weight of said gyro element on said platform.

4. The apparatus of claim 3 comprising:
    means for torquing said platform along two orthogonally displaced axes said torquing means also provided a rearward stop means for said platform.

5. The apparatus of claim 4 comprising:
    a torquer assembly comprising four magnetic poles projecting axially toward the base of said platform each of said pole faces being spherically contoured from the gimbal pivot center, and
    a matching spherically contoured steel return path mounted on the bottom of said platform separated from said pole faces by a narrow gap.

6. The apparatus of claim 1 comprising:
    a deloading means comprising a shaft passing through bores in said inner and outer gimbals;
    a ball bearing, and a shim, said shim being interposed between the outer gimbal and said ball bearing, said deloading means permitting the balls of said bearing to move down the races towards the bottom of the bearing groove when the radial load increases and under an overload condition causing the shaft to rest on the bore wall of the inner gimbal to take up the overload thereby preventing damage to the gimbal bearing.

7. The apparatus of claim 6 comprising:

means for preloading said bearing by applying a force in said bearing in opposite directions.

8. The apparatus of claim 1 comprising:

means inside said housing for caging said platform against setback and rebound force, said means for caging acting in compression along the platform column.

9. The apparatus of claim 8 comprising:

spherically contoured stop means in the forward and rear sections of said housing, said stop means acting on the forward and rear sections of said platform to cage said platform against the setback and rebound forces of cannon launching.

10. In a gyro seeker a caging mechanism comprising:

means for caging the platform of said gyro seeker during transport, said caging means disengaging from said platform when subjected to a source of gas pressure which is equalized above and below a volume of said caging means.

11. The apparatus of claim 10 comprising:

a quill having a plurality of inlet ports for the transfer of a gas, the upper end of said quill normally engaging said platform, the lower end of said quill having a large base situated in a chamber and having a controlled orifice whereby gas entering said chamber flows into said control orifice forcing said quill out of engagement with said platform when the pressure of the gas above the base portion of said quill equals the pressure of the gas below said base portion of said quill.

12. The apparatus of claim 11 comprising:

means in said quill for re-caging said platform with a pulse of available gas.

13. In a gyro seeker a two axis gyro comprising:

a housing;

a spherical stator mounted on a base within said housing;

a spherically shaped rotor mounted on gas bearing for rotation along two axes about said stator;

wheel sustainers means for maintaining continuous rotation of said rotor;

a plurality of torquer and pickoff means mounted around the base of said rotor;

a magnetic rim mounted on the periphery of said rotor above said pickoffs, said magnetic rim acting as a return path for flux emanating from said plurality of torquers and pickoffs; and caging means for holding said rotor in position prior to spin-up.

* * * * *